Patented Apr. 5, 1932

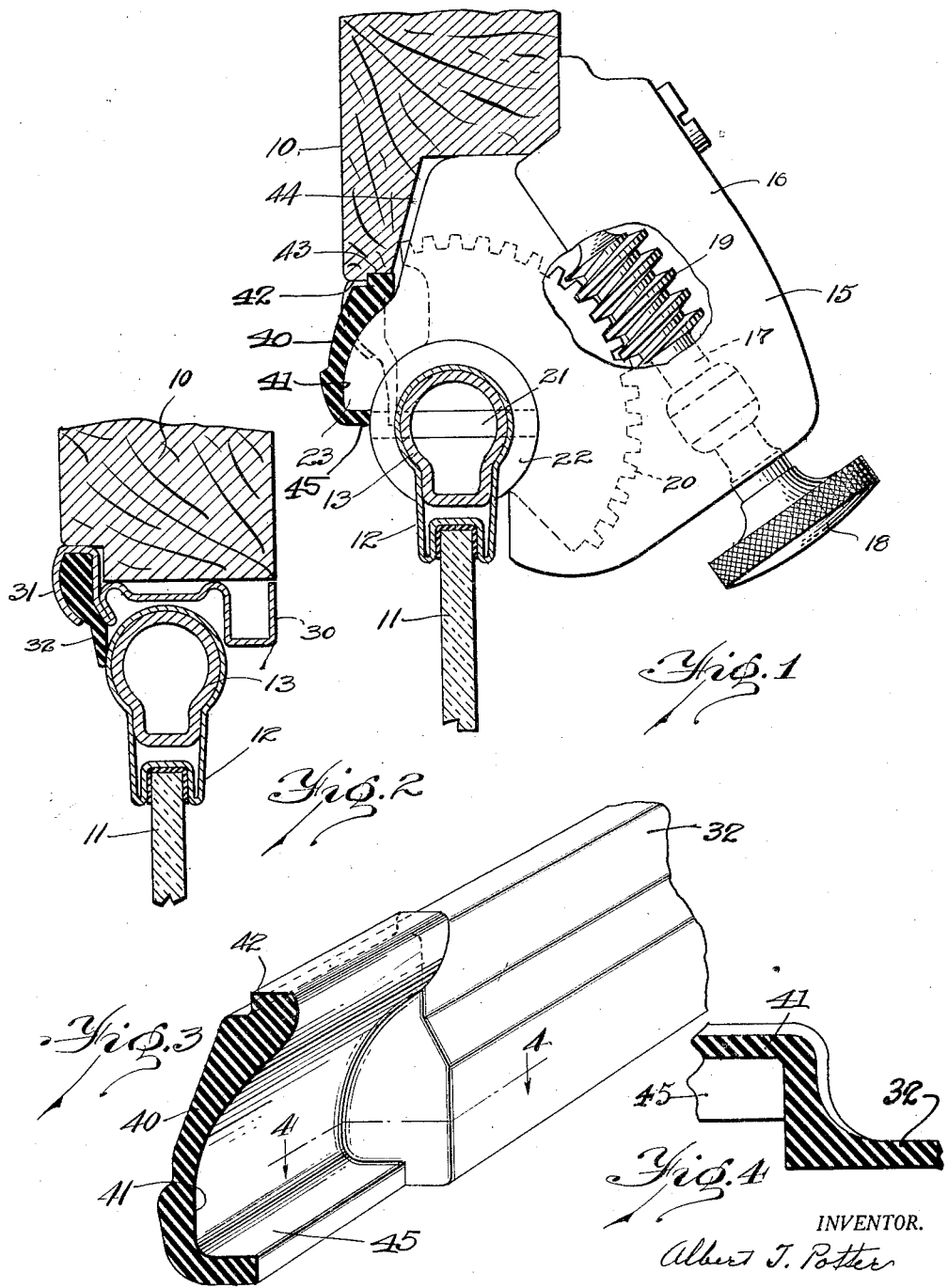

1,852,675

UNITED STATES PATENT OFFICE

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN

WEATHER STRIP FOR VEHICLE WINDSHIELDS

Application filed April 14, 1928. Serial No. 270,032.

The present invention relates to weather strips for the windshields of automobiles, and particularly, to a weather strip for the upper edge of a windshield provided with a windshield operator.

Heretofore, in the use of windshield operators for windshields in order that the windshield may operate freely, it has been customary to space the upper edge of the windshield frame from the adjacent top member and such spacing has necessitated means for closing this opening against the passage of air, rain, etc. As the windshield operator embraces this upper frame member, it necessarily forms an enlargement thereon interrupting the continuity of the surface of the frame member and this causes difficulty, particularly at this point, in weather stripping.

Among the objects of the present invention therefore, is to provide a weather strip which shall not only close the opening between the frame and the top member on each side of the operator, but will also effectively close the opening at and around said operator so as to produce a substantially wind and rain tight joint all the way across the top of the windshield.

Other objects will readily occur to those skilled in the art upon reference to the following description and the accompanying drawings, in which:—

Figure 1 is a sectional view of a windshield and operator showing the form of the weather strip at the location of the operator;

Figure 2 is a sectional view of the windshield top member and weather strip at a point away from the operator;

Figure 3 is a perspective view and section of the flexible weather strip showing its form at the operator;

Figure 4 is a section on line 4—4 of Figure 3.

In the drawings, the top member is indicated at 10 and this is usually a wooden sill portion that extends across the front of the vehicle top. A glass windshield is indicated at 11 and this is shown as fixed in a channel member 12 which is provided with a tubular portion 13 extending to the sides of the vehicle top or body where it is suitably hinged, the member 12—13 usually being spaced a short distance from the sill 10.

Intermediate the length of member 12, usually at about its center, is located a windshield operator indicated as a whole by the numeral 15. This operator consists of a housing 16 secured to the top member 10 and carrying a shaft 17 provided at its outer end with a suitable hand grip, such as the knurled knob 18.

The shaft 17 also carries a worm 19 coacting with a sector 20 which is fixed to the windshield frame member 13 as by means of the pin 21. The sector 20 in the form of device shown, is carried on a cylindrical bearing portion 22 having bearings at its ends in the sides of housing 16, and the latter is shown as having a nose piece 23 which extends over the bearing portions 22 and is necessarily of such thickness that its outer forward surface is some little distance in front of the surface of windshield frame member 13. For this reason, a straight strip of flexible weather strip cannot be extended all the way across the windshield in order to close the space above mentioned.

In the present invention, a sheet metal molding 30 is placed along the underside of top member 10 and this molding is provided along one edge with a channel 31 for the reception of a rubber weather strip 32. The sheet metal molding 30 will be of two portions, each being sufficiently long to extend from one end of the windshield frame to the housing 16 of the windshield operator and one piece of molding will be used on each side of the operator. At the point where the weather strip material passes over the operator housing, a molded portion of substantially the form shown in Figure 3 at 40 will be formed in the strip, there being no molding 30 on the sill 10 at this point.

This molded portion consists of a recessed part 41 for the reception of the nose piece 23 of the operator and will extend down over this nose portion 23 and under the latter, the ledge 45 being adapted to contact with the bearing member 22 mounted on the windshield frame. At its upper edge the molded portion 40 will be provided with a portion 42 which will be fitted in a suitable rabbet 43 cut in the top member 10. It is, of course, to be noted that a suitable recess 44 in top member 10 will be provided for the upper part of the housing 16 of the operator.

By providing the weather strip with this molded portion, continuous contact of the flexible weather strip may be had from one end of the windshield to the other, thus providing for the complete closing of the space between the windshield and the top member 10. The weather strip 32—40 is preferably made of rubber although any other satisfactory material may be used. The complete closure between sill 10 and windshield 11 includes therefore, three portions, namely, a portion comprising molding 30 and weather strip 32, a portion comprising only the weather strip molded portion 40—41—42—45, and strip 32.

Now having described the invention and the prefered form of embodiment thereof, it is to be understod that the said invention is to be limited not to the specific details herein described and illustrated, but only by the scope of the claims which follow.

I claim:—

1. In combination, a vehicle frame member, a windshield having its upper edge disposed adjacent said member, a windshield operator on the upper edge of said windshield and interrupting the continuity of the surface of the latter, and a weather strip for the space between said member and said upper edge, said weather strip including a body portion whose upper edge is fixed to the frame member and whose lower edge engages the upper edge of the windshield, the strip also having a molded portion integral with its body portion, the molded portion being recessed to enclose the housing of the operator, and having an upper edge engaging the frame member and a lower edge engaging the upper edge of the windshield.

2. A weather strip for a vehicle windshield provided with a windshield operator, comprising a rubber strip having a heavy substantially inflexible body portion adapted to be fixed to the vehicle frame and a longitudinal flexible lower edge adapted to press against the windshield frame and also provided with a heavy molded pocket portion adapted to extend over and conceal from the front of the vehicle that portion of the windshield operator which interrupts the continuity of the surface of the windshield frame member to which it is attached, said molded portion having an upper edge adapted to contact with the frame of the vehicle and a lower edge adapted to contact with the windshield frame on the front side thereof.

3. A weather strip for vehicle windshields having mechanical operating devices thereon, comprising sheet metal channel members adapted to be secured to the vehicle top frame member extending along the upper edge of the windshield, said channel members extending from each end of the windshield to said operator and a heavy rubber weather strip carried in said channel members and having a protruding flexible edge adapted to press against the windshield frame and also provided with a heavy molded pocket portion adapted to extend over the operator housing and connect the portions carried in said channel members, the edges of the molded portion engaging, respectively, with the top frame member and with the windshield frame.

4. For a vehicle windshield having as part thereof an operator protruding forwardly from the windshield frame near an upper edge thereof, a weather strip comprising a rubber strip having a heavy, substantially inflexible body portion adapted to be fixed to the vehicle frame and a longitudinal flexible lower edge adapted to press against the windshield frame, the strip being provided between its ends, with an integral molded portion, deformed from the body of the strip and shaped to extend over and conceal from the front of the vehicle that portion of the windshield operator which interrupts the continuity of the surface of the windshield frame member to which it is attached, said molded portion having an upper edge adapted to contact with the frame of the vehicle and a lower portion adapted to make sealing contact with the windshield, and thereby to effect an unbroken seal for the upper edge of the windshield.

ALBERT T. POTTER.